(12) United States Patent
Winchester et al.

(10) Patent No.: US 8,591,634 B2
(45) Date of Patent: Nov. 26, 2013

(54) METHOD AND EQUIPMENT FOR SELECTIVELY COLLECTING PROCESS EFFLUENT

(75) Inventors: David Charles Winchester, Walnutport, PA (US); Matthew John Bosco, Breinigsville, PA (US); Gerald W. Klein, Emmaus, PA (US); Isaac Patrick West, Los Angeles, CA (US); Richard Linton Samsal, Chandler, AZ (US); Douglas Paul Dee, Orefield, PA (US); Andrew David Johnson, Doylestown, PA (US); Eugene Joseph Karwacki, Jr., Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 121 days.

(21) Appl. No.: 13/009,400

(22) Filed: Jan. 19, 2011

(65) Prior Publication Data

US 2012/0012201 A1    Jan. 19, 2012

Related U.S. Application Data

(60) Provisional application No. 61/298,949, filed on Jan. 28, 2010.

(51) Int. Cl.
*B01D 53/02* (2006.01)
(52) U.S. Cl.
USPC ........ 96/127; 96/98; 96/102; 96/104; 96/148; 95/41; 137/511
(58) Field of Classification Search
USPC .......... 95/41; 96/98, 102, 104–106, 127, 148; 137/511
See application file for complete search history.

(56) References Cited

U.S. PATENT DOCUMENTS

| | | | | | |
|---|---|---|---|---|---|
| 3,101,261 | A | * | 8/1963 | Skarstrom | 95/98 |
| 3,212,236 | A | * | 10/1965 | Phillips et al. | 95/96 |
| 3,225,518 | A | * | 12/1965 | Skarstrom et al. | 95/41 |
| 4,045,191 | A | * | 8/1977 | Martin | 62/620 |
| 4,077,780 | A | | 3/1978 | Doshi | |
| 4,270,938 | A | * | 6/1981 | Schmidt et al. | 62/600 |
| 4,715,868 | A | * | 12/1987 | Kennedy | 95/94 |
| 5,368,067 | A | * | 11/1994 | Cook, Jr. | 137/485 |

(Continued)

FOREIGN PATENT DOCUMENTS

| EP | 0 983 791 A1 | 3/2000 |
|---|---|---|
| EP | 0983791 A1 | 3/2000 |

(Continued)

OTHER PUBLICATIONS

U.S. Appl. No. 61/388,279, filed Sep. 30, 2010 entitled Recovering of Xenon by Adsorption Process with Andrew David Johnson as the first named inventor.

*Primary Examiner* — Christopher P Jones
(74) *Attorney, Agent, or Firm* — Rosaleen P. Morris-Oskanian

(57) ABSTRACT

An apparatus and process for recovering a desired gas such as xenon difluoride, xenon, argon, helium or neon, from the effluent of a chemical process reactor that utilizes such gases alone or in a gas mixture or in a molecule that becomes decomposed wherein the chemical process reactor uses a sequence of different gas composition not all of which contain the desired gas and the desired gas is captured and recovered substantially only during the time the desired gas is in the effluent.

20 Claims, 3 Drawing Sheets

(56) References Cited

U.S. PATENT DOCUMENTS

| | | | |
|---|---|---|---|
| 5,536,300 A * | 7/1996 | Reinhold et al. | 95/101 |
| 6,217,633 B1 * | 4/2001 | Ohmi et al. | 95/8 |
| 6,277,173 B1 | 8/2001 | Sadakata et al. | |
| 6,605,134 B2 | 8/2003 | Ishihara et al. | |
| 7,169,210 B2 | 1/2007 | Baksh et al. | |
| 7,258,725 B2 | 8/2007 | Ohmi et al. | |
| 7,261,763 B2 | 8/2007 | Shirley | |
| 7,285,154 B2 * | 10/2007 | Karwacki et al. | 95/96 |
| 7,294,172 B2 | 11/2007 | Baksh et al. | |
| 8,308,854 B2 * | 11/2012 | McCauley et al. | 96/101 |
| 2003/0221555 A1 | 12/2003 | Golden et al. | |
| 2005/0109419 A1 | 5/2005 | Ohmi et al. | |
| 2005/0235828 A1 | 10/2005 | Ishihara | |
| 2006/0021421 A1 | 2/2006 | Downie et al. | |
| 2006/0107831 A1 * | 5/2006 | Karwacki et al. | 95/116 |
| 2009/0107331 A1 | 4/2009 | Urakami et al. | |
| 2009/0185969 A1 | 7/2009 | Lose et al. | |
| 2010/0180892 A1 * | 7/2010 | Downie | 128/203.14 |
| 2010/0294127 A1 * | 11/2010 | Dolensky | 95/11 |
| 2011/0138877 A1 * | 6/2011 | McCauley et al. | 73/23.37 |
| 2011/0204089 A1 * | 8/2011 | Shettle | 222/145.1 |
| 2012/0079939 A1 | 4/2012 | Johnson et al. | |

FOREIGN PATENT DOCUMENTS

| | | |
|---|---|---|
| EP | 1 060 774 A1 | 12/2000 |
| EP | 1 417 995 A1 | 5/2004 |
| JP | 64-075024 | 3/1989 |
| JP | 2001-046827 | 2/2001 |
| JP | 2003-164720 | 6/2003 |
| JP | 2003-311148 | 11/2003 |
| JP | 2004-000975 | 1/2004 |
| JP | 2004-148315 | 5/2004 |
| JP | 2005-103400 | 4/2005 |
| JP | 2005-246137 | 9/2005 |
| JP | 2005-349332 | 12/2005 |
| JP | 2006-061831 | 3/2006 |
| JP | 2007-021447 | 2/2007 |
| JP | 2007-130611 | 5/2007 |
| JP | 2012-087044 | 5/2012 |
| WO | 2007/055035 | 5/2007 |

* cited by examiner

METHOD AND EQUIPMENT FOR SELECTIVELY COLLECTING PROCESS EFFLUENT

CROSS REFERENCE TO RELATED APPLICATIONS

The present patent application claims the benefit of prior U.S. Provisional Patent Application Ser. No. 61/298,949 filed Jan. 28, 2010.

BACKGROUND OF THE INVENTION

There is a need to discriminate and effectively collect process gas containing high value desired gases, such as noble gases (Kr, Xe) from a source or effluent gas that is available on an intermittant and variable flow basis. It is very important that the apparatus to collect the desired gas not in any way interfere with the performance of the process equipment, such as a chemical process reactor to which the collection system is attached. Effluent gas from semiconductor processes, such as etching, typically are diluted at the process pump and then transferred through a gas manifold after the pump into a common effluent gas manifold that eventually goes to an abatement or scrubbing system. This comingling of effluent gases eventually dilutes the process effluent stream of interest making it very difficult to efficiently process to remove the species of interest, i.e., the desired gas, for recovery.

Gases which are either unacceptable as pollutant effluents or sufficiently valuable to recover are known to be recovered from waste streams from chemical processes. See U.S. Pat. No. 7,261,763.

Rare gases are recovered from effluents for packaging and transport to refinement and recycling. See U.S. Pat. No. 7,294,172 and U.S. Pat. No. 7,169,210.

Etchant gases from semiconductor processing are known to be recovered because of global warming potential. See U.S. Pat. No. 7,258,725.

Rare gas collection from effluent of semiconductor processing is known. See U.S. Pat. No. 6,605,134.

Recycle of perfluorocarbons (PFCs) from semiconductor processing is known. See U.S. Pat. No. 6,277,173.

Xenon recovery systems are known. See U.S. Pat. No. 7,285,154.

Xenon sensors are known. See US2006/00211421.

However, these processes do not address the discrete collection of the desired gas from other effluent gases passing through a chemical process effluent system in sequence and avoidance of upset conditions of such chemical process during the discrete collection of the desired gas. These and other advantages are obtained by the present invention which will be set forth in greater detail below.

BRIEF SUMMARY OF THE INVENTION

The present invention is an apparatus for recovering a desired gas from the effluent of a chemical process reactor that utilizes two or more gas compositions in sequence, comprising;
(a) a chemical process reactor provided with one or more lines for introducing two or more separate gas compositions into the chemical process reactor;
(b) a process controller for controlling the introduction of the separate gas compositions in the chemical process reactor;
(c) an effluent line from the chemical process reactor capable of removing effluents of the two or more separate gas compositions introduced into the chemical process reactor;
(d) a check valve in the effluent line allowing removal of the effluent from the chemical process reactor and preventing any substantial flow of effluent to the chemical process reactor;
(e) a recovery line capable of removing a desired gas from the effluent line;
(f) an automatic valve in the recovery line;
(g) a process controller capable of controlling introduction of two or more gas compositions in sequence into the chemical process controller and capable of controlling the operation of the automatic valve in the recovery line so that the automatic valve is open during at least a portion of the time when the desired gas is in the effluent line as a part of a gas composition, where the process controller is capable of generating and receiving process signals by signal connections with the chemical process reactor and the automatic valve; and,
(h) a compressor in the recovery line capable of removing the desired gas from the effluent line in sufficient flow to close the check valve in the effluent line.

The present invention is also a process for recovering a desired gas from the effluent of a chemical process reactor that utilizes two or more gas compositions in sequence, comprising;
(a) Introducing two or more gas compositions in sequence into the chemical process reactor, including the desired gas, through an inlet to the chemical process reactor;
(b) Removing an effluent from the chemical process reactor including the two or more gas compositions and the desired gas in sequence in an effluent line;
(c) Passing the effluent through a check valve having a crack pressure setting;
(d) Removing a portion of the effluent from the effluent line upstream of the check valve, which portion of the effluent contains a substantial portion of the desired gas, wherein the removal closes the check valve, such removal conducted through a recovery line controlled by an automatic valve;
(e) Controlling the operation of the automatic valve by a process controller in signal communication with the automatic valve, wherein the process controller at least monitors the introduction of the two or more gas compositions into the chemical process reactor or its inlet by signal communication with one or more of the chemical process reactor or its inlet; and,
(f) Opening the automatic valve to recover the gas composition containing the desired gas from the effluent line during at least a portion of the time when the desired gas is in the effluent line as a part of a gas composition.

DETAILED DESCRIPTION OF THE INVENTION

Figure 1:
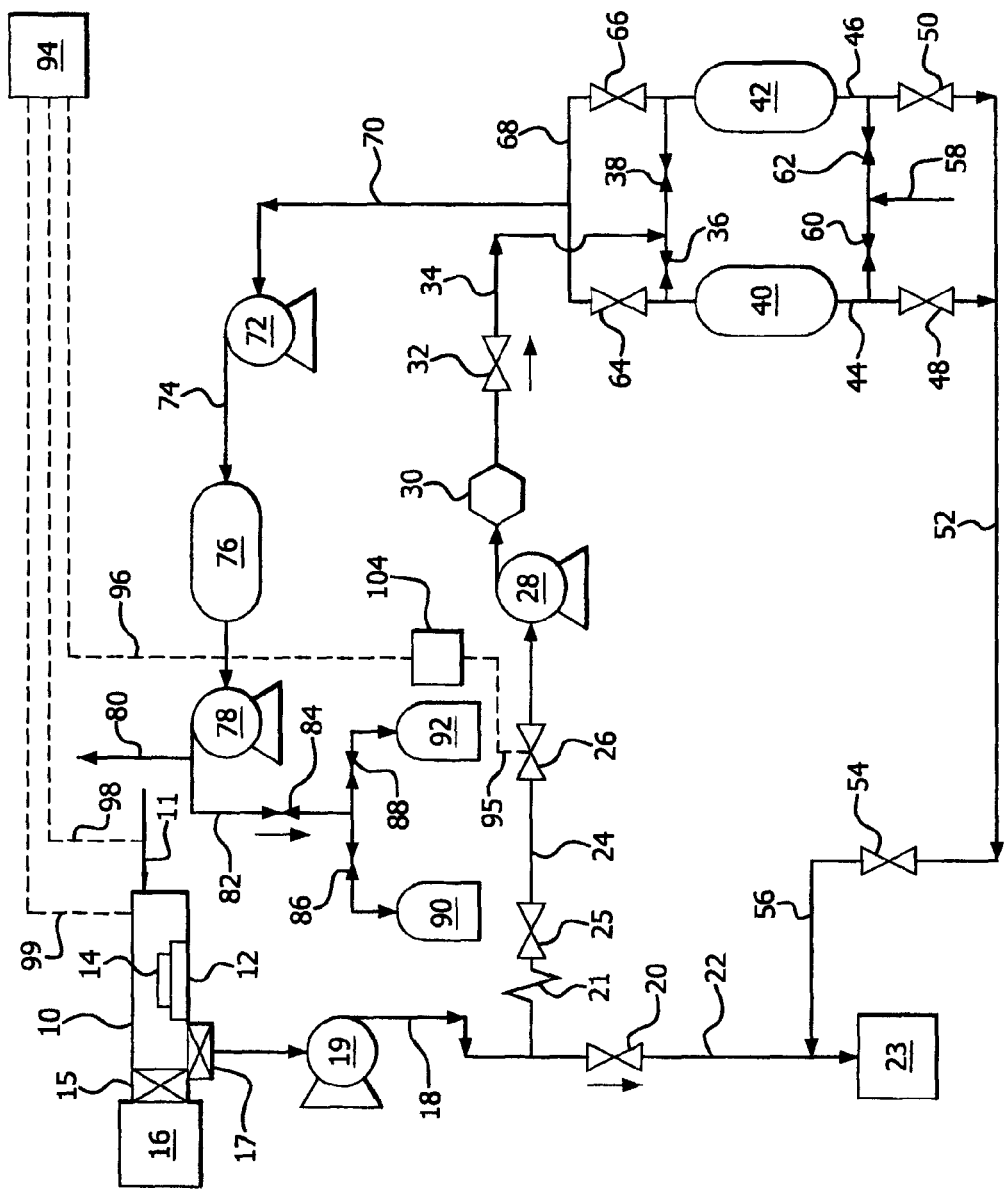
FIG. 1 is a schematic illustration of an embodiment of the present invention for collecting a desired gas in a discrete manner from a chemical process reactor effluent.

There is a need to discriminate and effectively collect process gas containing high value materials such as noble gases (Kr, Xe, He, Ne, Ar, Rn) as a desired gas from a source gas or effluent gas, which desired gas is available on an intermittant and/or variable flow basis, in contrast to the continuous flow of effluent gases from a process, such as a chemical process reactor exemplified by a semiconductor process reactor. It is desirable that the apparatus to collect the desired gas not interfere with the performance of the process equipment, i.e., chemical process reactor, to which the collection system is attached. This idea enables collecting the desired gas by connecting to the control system, i.e., process controller or computer, and process exhaust using an automatic valve that is actuated at the appropriate times. An alternate approach is to utilize an onboard sensor after the chemical process reactor, such as in the effluent line from the chemical process reactor. The sensor would detect the presense of the species of interest, such as a desired gas exemplified by xenon, and activate the process controller to initiate recovery or collection of such gas. Actuation of the automatic valve is controlled by logic based on measurement of key process parameters. The system includes process equipment that provides vacuum and capacity needed to collect and store the desired gas. Such equipment creates an appropriate level of capacity, such that a steady flow of desired gas contained in an effluent gas can be metered into an enrichment system, such as a vacuum swing adsorption system (VSA), temperature swing adsorption system (TSA), or pressure swing adsorption system (PSA).

This invention addresses a need for a method to efficiently collect valuable vented desired gases (such as xenon) from multiple process effluent streams that contain the desired gas on, preferably, an intermittent basis. The method comprises a system for monitoring/measuring the process parameters, logic for control, an automatic valve to divert the gas when selected, a check valve, a vacuum system, and storage volume. The interface operates by utilizing a pressure difference between the recovery gas manifold or recovery line and the normal waste gas manifold or effluent line after the process pumps/compressors. Upon receiving a signal from the process controller, an automatic valve, such as a solenoid valve is opened. The reduced pressure within the recovery line forces closure of a check valve in the effluent line. This now diverts the effluent gas toward the recovery line. The system also contains process logic to selectively signal when the species of interest or desired gas is present, as well as to shut-off flow, if the species of interest or desired gas is not present, or another species is present that could cause disruptions to the downstream recovery system. The process logic can also compensate for the time required for the species of interest or desired gas, such as xenon, to travel from the chemical process reactor to the recovery line or automatic valve. This is accomplished by an adjustable delay in the opening and closing of the automatic valve.

The interface with the chemical process reactor may comprise a tee to tap into the effluent line, a shutoff valve, an analytical port (optional), a flex line to reduce vibrational coupling and stresses, a pressure gauge (optional), solenoid valve, and a manual shutoff valve to enable isolation of the chemical process reactor from the recovery system.

Effluent gas from semiconductor or chemical process reactor, such as etching, typically are diluted at the process pump and then transferred through a gas manifold or effluent line after the pump into a common effluent gas manifold that eventually goes to an abatement or scrubbing system. This comingling of effluent gases eventually dilutes the process effluent compositions and the desired gas of interest, making it very difficult to efficiently process to remove the species of interest or desired gas for recovery. Thus, it is preferable that the desired gas of interest be segregated from the other effluent streams prior to arrival in the common header. For this to be accomplished the desired gas of interest is diverted towards the recovery system between the process chambers and entrance to the common header. Furthermore, this diversion must be performed in a manner that prevents any interference with the flow of process gases through the chemical process reactor. Such disruptions could cause failures in the manufacturing process that could lead to yield losses. Thus, the waste gas collection system should be transparent to the chemical process reactor. This invention enables efficient and timely transfer of effluent gas, which contains the species of interest or desired gas for recovery. Furthermore, it performs this transfer in a manner that essentially does not interfere with the processing within the chemical process reactor.

Another problem this collection apparatus solves is that it enables collection of gas streams or desired gas simultaneously from many process chambers, that may only be processing with the desired gas of interest in an intermittent manner. The interface performs this function by receiving signals from any chemical process reactor or its effluent line and determining when the desired gas of interest for recovery is present in the effluent gas stream. Furthermore, if there happens to be species which the recovery system does not want to accept during intervals of the process, it is possible to program it via additional signals from the chemical process reactor and pre-determined timing to discriminate against these portions of the effluent stream from being diverted to the recovery system.

The normal flow of process gas is through the chemical process reactor to a process pump located on the effluent line of the chemical process reactor. These pumps can be many types, including: turbomolecular, cryogenic, and diffusion type pumps to achieve high vacuums. These pumps are then backed up using mechanical pumps, which compress the effluent gas for exhausting. At the mechanical pump, nitrogen dilution is typically performed to lower the flammability limits of the effluent gas, to dilute the effluent gas below lethal dose levels (LDLs), to help cool the process pump as it operates, as well as to seal the pumps to prevent leaks. There may be other reasons for adding nitrogen dilution. At this point, the effluent gas then traverses through a gas manifold to a larger exhaust gas manifold, where effluent gases from many processes comingle. In order to efficiently recover high valued species, such as desired gases exemplified by xenon, from an effluent gas, it is desirable to divert the effluent gas containing the species of interest or desired gas away from this collection manifold and towards the recovery system. The reasons for performing this diversion include: presence of species of interest (desired gas) at high enough concentrations to enable efficient recovery, reduction of contaminants from other processes that could poison or reduce collection efficiency, and reduction of the overall volume of effluent gas to the recovery system to a volume more manageable for the size of the recovery system.

The challenge to placing a diversion system onto the effluent line of a chemical process reactor is that the diversion system should not compromise the process underway within the chemical process reactor(s). Any interference with gas flow has the potential to disrupt pressures, gas flow, and pumping efficiencies. These could lead to process disruptions, which could result in loss of product yield. Thus, it is desirable that the reactor interface perform in a transparent manner to the chemical process reactor. Another challenge is that oftentimes chemical process reactors perform many types of duties. Some of these may include the species (desired gas) desired for recovery, and at other times the species of interest (desired gas) may not be part of the effluent gas stream. During these times, it is not desirable to collect and process the effluent gas, because it can lead to inefficiencies. Another challenge is that during the flow of process gas containing the species of interest (desired gas), there might be present other species, that because of safety or risks to the recovery system, it is inappropriate to collect. Oftentimes these species are destroyed during the process and it is only necessary to exclude them from the collection process during various points of the process recipe. Finally, there are often multiple chemical process reactors present, and each is utilizing the desired gas intended for recovery at intermittent time intervals. Thus, it is desirable to have the capability to independently perform desired gas diversion at each chemical process reactor towards the collection header for the recovery system.

This reactor interface invention addresses each of the aforementioned challenges for enabling efficient recovery of desired gas from a process effluent gas stream.

There are many options potentially available for placing the system onto a chemical process reactor for diverting process effluent gas to a recovery system. The method pursued in this invention attached the interface upstream to a ball check valve located on the atmospheric side of the exhaust effluent pump. In normal operation, the effluent gas flows from the pump at a pressure slightly above atmospheric pressure (0.04 psig). This ball check valve only enables flow of gas in the direction from the exhaust pump to the effluent gas manifold. The reactor interface is connected in via a tee in between the process pump and the ball check valve. The interface consists of pressure gauge (optional), an automatic (solenoid or pneumatically actuated) valve, and a shut-off valve to enable safe closure of the line from the recovery system, when maintenance is required. An electrical reactor interface controller is attached to the automatic (solenoid, etc.) valve to open/close the valve, when effluent gas containing the species (desired gas) to be recovered is present within the effluent stream. Just before the reactor interface unit, a shutoff valve, analytical port, and flex hosing may be attached to the tee to facilitate servicing and to reduce vibrational coupling between the chemical process reactor and the recovery system.

Upstream to the recovery system, a compressor is present on the recovery gas line. The pressure within the recovery line is held at a pressure below the normal discharge pressure of the exhaust effluent pump, typically the recovery line is at less that 1 atmosphere. When the automatic (solenoid, etc.) valve is activated open to begin gas diversion to the recovery system, the reduced pressure causes the ball check valve to shut gas flow off to the primary effluent gas manifold, and divert it to the recovery gas manifold system. Process effluent gas then flows out of the exhaust effluent pump and towards the recovery system for processing. When the process signal is given to stop flow of gas to the recovery system, this releases the ball within the ball check valve and enables flow of gas again from the chemical process reactors to the effluent gas manifold.

The materials of construction of the reactor interface should able to withstand process temperatures up to 100° C. This is preferable, because the temperature of the effluent gas as it departs the vacuum pump may be close to this temperature.

Because there may be situations where the effluent stream contains undesirable materials, the electronic controller is equipped with process logic capability that enables shut-off of the gas diversion, when these species are present. This can be done in a number of ways, including; the use of process sensors and on-line process analyzers. Another methodology adopted is the use of process signals from the chemical process reactor and comparison against a threshold to determine when these species are present. Using a combination of signals from the chemical process reactor and analytical is another approach to addressing this issue. Signals from the effluent line are also possible.

The apparatus and process of the present invention will now be described in one embodiment with reference to the figures.

In FIG. 1, two or more gas compositions are introduced in a prescribe sequence through an inlet 11 into a semiconductor chemical process reactor 10 to assist in the performance of various steps of semiconductor fabrication, including etching of a semiconductor substrate 14 mounted on a platen 12 and/or cleaning of the inside surface of the reactor 10 of by-product inadvertent depositions. The substrate 14 may be one or more semiconductor wafers such as a "boat" or carrier of a series of wafers stacked on their edge. The substrate 14 is introduced into the reactor 10 through a load lock 15 from a load chamber 16. The reactor 10 and the inlet 11 can be controlled and or monitored by signal connections 99 and 98 to a process controller 94. For instance, the process controller can monitor the reactor 10 through signal connection 99, adjust its temperature, control plasma conditions and maintain pressures to set parameters.

Likewise, the flow of various gas compositions can be monitored and/or controlled by signal connection 98 to the process controller 94, such that a sequence of gas compositions are introduced into the reactor 10 through the inlet 11, including at least one gas composition containing a desired gas in elemental form or molecular form. An example would be the introduction of xenon difluoride, as an etch gas, where the xenon difluoride is decomposed under the conditions in the reactor 10, and the xenon is desired to be recovered for reuse and recycling, as a desired gas in the effluent of the reactor 10.

Effluent from the reactor 10 can pass through an optional second load lock 17 into a exhaust effluent pump/compressor 19 and an effluent line 18. The effluent continues through a check valve 20 that prevents backflow of effluent towards the reactor 10. The check valve 20 is set with a minimum cracking pressure, which represents the pressure at which it will open to allow flow and below which it will close to prevent backflow toward the reactor 10.

Figure 2:
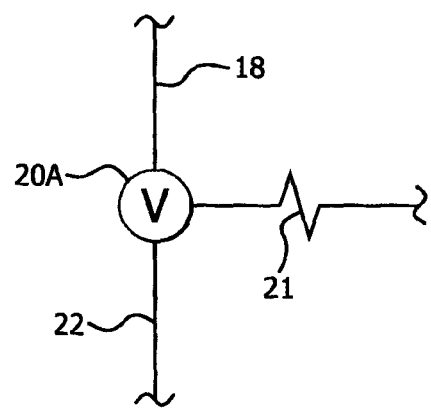
FIG. 2 is a partial section of FIG. 1 showing an alternate valve arrangement using three-way valve 20A.

In another configuration, rather than using a check valve to divert gas, a three-way valve 20A, shown in FIG. 2, could also be employed to divert the effluent gas towards the recovery system. This method for diverting the waste gas may not be preferred to the check valve approach, because there exists the possibility that pressure spikes could occur in the effluent line, which could impact the pressure within the process reactor. However, for processes that are not as sensitive to changes in pressure and flow, this method for diversion may be acceptable.

Effluent that passes through the check valve 20 is sent in line 22 to an abatement, scrubbing and vent system 23 to decompose, burn or sorb toxic, hazardous, corrosive or global warming gases, before the residual effluent gases are vented.

A recovery line 24 is connected to the effluent line 18 upstream of the check valve 20. The recovery line 24 is controlled by an automatic valve 26, which may be a pneumatic actuated valve or an electric solenoid valve or similar automatic valve capable of operating upon a pneumatic, electrical or other signal sent by a recovery system process controller 104, which may not necessarily be connected to the process controller 94, such recovery system process controller communicating with the automatic valve 26 through signal connection 95. Process controller 94 and recovery process controller 104 can be discrete or their functionality may be combined in one controller for various embodiments of the present invention.

The recovery line can be vibration isolated form the effluent line 18 by a flexible line section 21 that prevents vibrations from being transmitted either from the effluent line to the recovery line 24 or from the recovery line 24 to the effluent line 18. Recovery line can also be manually closed off from the effluent line, for instance for service, my manual shutoff valve 25.

A compressor 28 is situated in the recovery line 24 to remove effluent from the effluent line 18 when automatic valve 26 is open. The compressor 28 is capable of reducing the pressure of the recovery line 24 and thus the effluent line 18, so that check valve 20 closes. The pressure differential across check valve 20 must be higher than the cracking pressure of the check valve 20. In this manner the entire effluent gas flow in effluent line 18 may be diverted into recover line 24. This would occur typically when the desired gas is in the gas composition of the effluent in the effluent line during the sequence of introduction of gas compositions into the reactor 10 when the desired gas is introduced into the reactor or in a phase time delayed from such introduction when the desired gas is being exhausted from the reactor 10 in the effluent line 18. This timing, sequence and delayed, phased time to discretely remove and recover the desired gas from the effluent's overall substantially continuous flow is monitored and/or controlled by the process controller 94 through its signal connections 96, 98 and 99 and the recovery system process controller 104 and its signal connection 95 to the automatic valve 26. As stated above, these controllers may be discrete or their functions combined in one controller. Monitoring the composition of the effluent stream is also possible.

Figure 3:
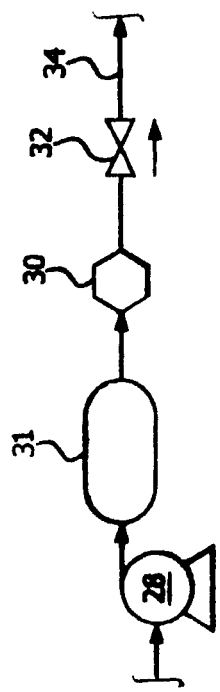
FIG. 3 is a partial section of FIG. 1 showing an embodiment with a buffer tank 31 downstream of the compressor 28 and upstream of the guard bed 30.

When automatic valve 26 is open and the desired gas is removed through compressor 28, the gas is then passed through a sorptive guard bed 30 to remove corrosive, toxic, hazardous or global warming class gas constituents that may be included in the desired gas, along with other gases, such as inert gases exemplified by nitrogen. In an embodiment of the present invention, shown in FIG. 3, a buffer tank 31 is situated downstream of compressor 28 and upstream of guard bed 30. The buffer tank 31 moderates any pressure variances as different reactors 10 feed the desired gas to line 24, so that the beds 40 and 42 see feed gas of a substantially constant pressure. The desired gas then passes through a check valve 32 in line 34 and is alternately subjected to selective sorptive separation in parallel switching sorptive separation beds 40 and 42, alternatively on feed sorption and countercurrent depressurization and purge by alternate passage through one of either valve 36 or 38. In the case of xenon being the desired gas in a carrier gas of nitrogen, the nitrogen is typically least strongly adsorbed on adsorbents, such as: activated carbon, zeolites and aluminas and passes through the beds 40 or 42 unadsorbed, while the xenon is adsorbed on the adsorbent in the beds 40 and 42. Just before xenon breakthrough in the downstream end of the beds that are on feed, such as near line 44 or 46 respectively, that bed on feed is taken off feed by closing valve 36 or 38 respectively, and valve 48 or 50 respectively. The bed that has finished feed, is then depressurized countercurrently through valves 64 or 66, respectively, through lines 68 and 70 and is compressed in additional compressor 72 through line 74 to surge tank 76 to collect the gas and mix it for uniformity. This gas contains enriched desired gas, such as xenon, relative to the gas in line 24. The compressed desired gas, e.g. xenon, is further compressed in additional compressor 78 and can be recycled to the reactor 10, taken to further processing or stored in one or more storage containers 90 and 92 through check valve 84 and, alternately and respectively, valves 86 and 88. Preferably, while one container of the two containers 90 and 92 is being filled, the other container is being removed for remote processing and an empty container is being connected to line 82 to be filled when the remaining container is full.

In addition to recovering the sorbed desired gas, such as xenon, from the beds 40 and 42 by countercurrent depressurization, it is also contemplated to further remove the sorbed desired gas by evacuation conducted by compressor 72. Further or alternatively, desired gas can be desorbed from the beds 40 and 42 by a carrier gas, such as inert gases, exemplified by nitrogen introduced through line 58 and alternatively valves 60 or 62, depending on which bed 40 or 42 is on depressurization mode to purge the desired gas from the sorbent in the beds 40 and 42.

The unrecovered and unsorbed gas constituents of the gas mixture, diminished in desired gas that passes substantially unsorbed through beds 40 and 42, are removed through valves 48 and 50, respectively, to be returned in line 52, valve 54 and line 56 to the effluent line 22 to be treated in the abatement and vent system 23 to decompose, burn or sorb toxic, hazardous, corrosive or global warming gases, before the residual effluent gases are vented.

The invention claimed is:

1. An apparatus for recovering a desired gas from the effluent of a chemical process reactor that utilizes two or more separate gas compositions in sequence, comprising;
    (a) a chemical process reactor provided with one or more lines for introducing two or more separate gas compositions into the chemical process reactor, having a signal connection to a process controller;
    (b) at least one inlet connected to the chemical process reactor for introducing the separate gas compositions in the chemical process reactor;
    (c) an effluent line from the chemical process reactor capable of removing effluents of the two or more separate gas compositions introduced into the chemical process reactor;
    (d) a check valve in the effluent line allowing removal of the effluent from the chemical process reactor and preventing any substantial flow of effluent to the chemical process reactor having a set cracking pressure;
    (e) a recovery line having a connection to the effluent line, upstream of the check valve, capable of removing a desired gas from the effluent line;
    (f) an automatic valve in the recovery line having a signal connection to the process controller;
    (g) the process controller capable of controlling introduction of two or more gas compositions in sequence into the chemical process reactor and capable of controlling operation of the automatic valve in the recovery line so that the automatic valve is open during at least a portion of the time when the desired gas is in the effluent line as a part of a gas composition, where the process controller is capable of generating and receiving process signals by signal connections with the chemical process reactor and the automatic valve; and,
    (h) a compressor in the recovery line capable of removing the desired gas from the effluent line in sufficient flow to close the check valve in the effluent line below the check valve's cracking pressure setting.

2. The apparatus of claim 1 including a recycle line in flow communication with the recovery line and in flow communication with the effluent line downstream of the connection of the recovery line to the effluent line capable of returning at least a part of the gas compositions to the effluent line.

3. The apparatus of claim 1 wherein the check valve has a set point to close upon the operation of the compressor.

4. The apparatus of claim 1 wherein the recovery line includes a sorptive guard bed to remove corrosive or reactive gases from the effluents.

5. The apparatus of claim 1 including an at least one sorptive separation bed capable of selectively separating the desired gas from the effluent gas and connected to the recovery line.

6. The apparatus of claim 5 wherein the sorptive separation bed comprises two sorptive separation beds connected in parallel by flow lines and valves capable of being operated in phased connection to the recovery line.

7. The apparatus of claim 5 wherein a buffer tank is downstream of the compressor in the recovery line and upstream of the sorptive separation bed.

8. The apparatus of claim 1 wherein the at least one sorptive separation bed is connected to a line in flow communication with at least one storage container capable of storing the desired gas.

9. The apparatus of claim 8 wherein an additional compressor is connected to the storage container to compress the desired gas.

10. The apparatus of claim 1 including a line for removing unrecovered and unsorbed gas in flow communication with the recovery line and in flow communication with the effluent line downstream of the connection of the recovery line to the effluent line capable of returning at least a portion of the unrecovered and unsorbed gas to the effluent line.

11. A process for recovering a desired gas from the effluent of a chemical process reactor that utilizes two or more gas compositions in sequence, comprising;
   (a) introducing two or more gas compositions in sequence into the chemical process reactor, including the desired gas, through an at least one inlet to the chemical process reactor;
   (b) removing an effluent from the chemical process reactor including the two or more gas compositions and the desired gas in sequence in an effluent line;
   (c) passing the effluent through a check valve in the effluent line having a crack pressure setting;
   (d) removing a portion of the effluent from the effluent line upstream of the check valve, which portion of the effluent contains a substantial portion of the desired gas, wherein the removal closes the check valve, such removal conducted through a recovery line controlled by an automatic valve;
   (e) controlling the operation of the automatic valve by a process controller in signal communication with the automatic valve, wherein the process controller at least monitors the introduction of the two or more gas compositions into the chemical process reactor or its at least one inlet by signal communication with one or more of the chemical process reactors or their at least one inlets;
   (f) opening the automatic valve to recover the gas composition containing the desired gas from the effluent line during at least a portion of the time when the desired gas is in the effluent line as a part of a gas composition; and
   (g) closing the check valve in the effluent line via a compressor in the recovery line when the crack pressure drops below the cracking pressure setting.

12. The process of claim 11 wherein the chemical process reactor is a semiconductor fabrication process reactor.

13. The process of claim 11 wherein the desired gas is a noble gas.

14. The process of claim 13 wherein the desired gas is selected from the group consisting of helium, argon, xenon difluoride and xenon.

15. The process of claim 13 wherein the concentrated desired gas is captured in at least one storage container.

16. The process of claim 11 wherein the portion of the effluent containing a substantial portion of the desired gas is separated in at least one sorptive separation bed to recovery a concentrated desired gas and a further effluent gas.

17. The process of claim 11 wherein the removal of a portion of the effluent from the effluent line through the recovery line closes the check valve by reducing the effluent pressure at the check valve below its cracking pressure setting.

18. The process of claim 11 wherein the automatic valve is opened by a signal communication from the process controller at a time subsequent to the introduction of the desired gas into the chemical process reactor wherein the time subsequent comprises a time required for the desired gas to flow through the chemical process reactor and into the effluent line.

19. An apparatus for recovering a desired gas from the effluent of a chemical process reactor that utilizes two or more separate gas compositions in sequence, comprising;
   (a) a chemical process reactor provided with one or more lines for introducing two or more separate gas compositions into the chemical process reactor, having a signal connection to a process controller;
   (b) at least one inlet connected to the chemical process reactor for introducing the separate gas compositions in the chemical process reactor;
   (c) an effluent line from the chemical process reactor capable of removing effluents of the two or more separate gas compositions introduced into the chemical process reactor;
   (d) a three-way valve in the effluent line allowing removal of the effluent from the chemical process reactor to a recovery line;
   (e) the recovery line having a connection to the effluent line capable of removing a desired gas from the effluent line;
   (f) an automatic valve in the recovery line having a signal connection to the process controller;
   (g) the process controller capable of controlling introduction of two or more gas compositions in sequence into the chemical process reactor and capable of controlling operation of the automatic valve in the recovery line so that the automatic valve is open during at least a portion of the time when the desired gas is in the effluent line as a part of a gas composition, where the process controller is capable of generating and receiving process signals by signal connections with the chemical process reactor and the automatic valve;
   (h) a compressor in the recovery line capable of removing the desired gas from the effluent line; and
   (i) at least one sorptive separation bed capable of selectively separating the desired gas from the effluent gas and connected to the recovery line.

20. A process for recovering a desired gas from the effluent of a chemical process reactor that utilizes two or more gas compositions in sequence, comprising;
   (a) introducing two or more gas compositions in sequence into the chemical process reactor, including the desired gas, through an at least one inlet to the chemical process reactor;
   (b) removing an effluent from the chemical process reactor including the two or more gas compositions and the desired gas in sequence in an effluent line;

(c) passing the effluent through a three-way valve;
(d) removing a portion of the effluent from the effluent line through the three-way valve, which portion of the effluent contains a substantial portion of the desired gas, such removal conducted through a compressor in the recovery line controlled by an automatic valve;
(e) controlling the operation of the automatic valve by a process controller in signal communication with the automatic valve, wherein the process controller at least monitors the introduction of the two or more gas compositions into the chemical process reactor or its at least one inlet by signal communication with one or more of the chemical process reactors or their at least one inlets; and,
(f) opening the automatic valve to recover the gas composition containing the desired gas from the effluent line during at least a portion of the time when the desired gas is in the effluent line as a part of a gas composition wherein the portion of the effluent containing the desired gas is separated in at least one sorptive separation bed to recover a concentrated desired gas and a further effluent gas.

\* \* \* \* \*